United States Patent
Lekas (10) Patent No.: US 11,526,946 B2
(45) Date of Patent: Dec. 13, 2022

(54) VIRTUAL HOME INSPECTION

(71) Applicant: Esurance Insurance Services, Inc., San Francisco, CA (US)

(72) Inventor: Stephen Nicholas Lekas, San Francisco, CA (US)

(73) Assignee: ESURANCE INSURANCE SERVICES, INC., San Francisco, CA (US)

( * ) Notice: Subject to any disclaimer, the term of this patent is extended or adjusted under 35 U.S.C. 154(b) by 38 days.

(21) Appl. No.: 16/433,648

(22) Filed: Jun. 6, 2019

(65) Prior Publication Data

US 2019/0287181 A1  Sep. 19, 2019

Related U.S. Application Data

(63) Continuation of application No. 14/331,097, filed on Jul. 14, 2014, now Pat. No. 10,360,634.

(60) Provisional application No. 61/847,056, filed on Jul. 16, 2013.

(51) Int. Cl.
*G06Q 40/08* (2012.01)

(52) U.S. Cl.
CPC .................................. *G06Q 40/08* (2013.01)

(58) Field of Classification Search
CPC ......... G06Q 40/00; G06Q 40/08; G06Q 10/10
USPC ................................ 705/4, 35; 235/375, 379
See application file for complete search history.

(56) References Cited

U.S. PATENT DOCUMENTS

| | | | |
|---|---|---|---|
| 5,504,674 A * | 4/1996 | Chen ...................... | G06Q 40/08 345/667 |
| 7,962,485 B1 * | 6/2011 | Trandal ................. | G06Q 10/087 707/736 |
| 8,484,050 B2 | 7/2013 | Hoffman et al. | |
| 10,529,026 B2 * | 1/2020 | Lekas ..................... | G06Q 40/08 |
| 2005/0131742 A1 * | 6/2005 | Hoffman ................ | G06Q 40/08 705/4 |
| 2009/0138290 A1 * | 5/2009 | Holden ................. | G06Q 10/087 705/4 |
| 2009/0265193 A1 * | 10/2009 | Collins .............. | G06Q 30/0185 705/4 |

(Continued)

FOREIGN PATENT DOCUMENTS

CN           202979145 U        6/2013

OTHER PUBLICATIONS

Goldin et al., "Mobile geotagged data gathering for disaster remediation," 2012 IEEE International Conference on Communication, Networks and Satellite (ComNetSat), 2012, pp. 69-73 (Year: 2012).*

(Continued)

*Primary Examiner* — Kelly S. Campen
(74) *Attorney, Agent, or Firm* — Polsinelli PC (57) ABSTRACT

A method, system and computer-readable medium are provided for facilitating a virtual inspection of an insurable area, the method including the steps of receiving an indication of a request from a user at a user mobile device to perform a virtual inspection of an insurable area, determining one or more information items needed with respect to the insurable area, providing a set of instructions to the user at the mobile device for capturing one or more image items based on the determined one or more information items, receiving a set of image items from the mobile device in response to the instructions and providing an insurance decision for the insurable area based on the received set of image items.

15 Claims, 7 Drawing Sheets

(56) References Cited

U.S. PATENT DOCUMENTS

| | | | |
|---|---|---|---|
| 2010/0174564 A1* | 7/2010 | Stender | G06Q 40/08 |
| | | | 705/4 |
| 2011/0091092 A1* | 4/2011 | Nepomniachtchi | |
| | | | G06K 9/00463 |
| | | | 382/139 |
| 2012/0330692 A1 | 12/2012 | Read et al. | |
| 2013/0073318 A1 | 3/2013 | Feldman et al. | |
| 2013/0297353 A1* | 11/2013 | Strange | G06K 9/00449 |
| | | | 705/4 |
| 2013/0339065 A1 | 12/2013 | Denning et al. | |
| 2014/0172465 A1 | 6/2014 | Yoder | |
| 2014/0320590 A1* | 10/2014 | Laurentino | H04N 21/4788 |
| | | | 348/14.08 |

OTHER PUBLICATIONS

Hu W-C., "Mobile Commerce Applications," Internet-Enabled Handheld Devices, Computing, and Programming: Mobile Commerce and Personal Data Applications, Nov. 2008 (Year: 2009), 5 pages.

* cited by examiner

VIRTUAL HOME INSPECTION

CROSS-REFERENCE TO RELATED APPLICATION

This Application is a Continuation of application Ser. No. 14/331,097 filed on Jul. 14, 2014, entitled "VIRTUAL HOME INSPECTION," which claims the benefit of U.S. Provisional Application 61/847,056 filed on Jul. 16, 2013, entitled "VIRTUAL HOME INSPECTION," the entire contents of these applications are incorporated herein by reference in their entirety.

BACKGROUND

Field

The present disclosure generally relates to insurance services, and more particularly to property inspection for property insurance.

Description of the Related Art

The homeowners insurance industry uses certified property inspectors to provide property inspection data. The property inspection data provides risk characteristic information to an insurance carrier to be used by the insurance carrier in rating and underwriting a property's insurance policy. The cost of having the certified property inspector sent to the property is often passed along to the consumer purchasing the insurance policy.

SUMMARY

In certain embodiments, a method is provided for facilitating virtual inspection of an insurable area. The method includes the steps of receiving an indication of a request from a user at a user mobile device to perform a virtual inspection of an insurable area, determining one or more information items needed with respect to the insurable area, providing a set of instructions to the user at the mobile device for capturing one or more image items based on the determined one or more information items, receiving a set of image items from the mobile device in response to the instructions and providing an insurance decision for the insurable area based on the received set of image items.

In certain embodiments, a system for facilitating a virtual inspection of an insurable area is provided. The system includes a client application installed at a user mobile device and a server for hosting the client application. In certain embodiments, the server includes one or more processors and a machine-readable medium including instructions stored therein, which when executed by the processors, cause the processors to perform operations. The operations include receiving a request from the mobile device to perform a virtual inspection of an insurable area, determining one or more information items needed with respect to the insurable area, providing a set of instructions to the user at the mobile device for capturing one or more image items based on the determined one or more information items, receiving a set of image items from the mobile device in response to the instructions, analyzing the set of image items and extracting at least one of the one or more information items from the set of image items.

In certain embodiments, a non-transitory computer-readable medium having computer-executable instructions stored thereon for execution by a processor to perform a method for facilitating a virtual inspection of an insurable area is provided. The method may include the steps of receiving an indication of a request from a user at a user mobile device to perform a virtual inspection of an insurable area, determining one or more information items needed with respect to the insurable area, providing a set of instructions to the user at the mobile device for capturing one or more image items based on the determined one or more information items, the instructions identifying a list of areas of the insurable area, receiving a set of image items from the mobile device in response to the instructions, the set of image items providing images from one or more of the list of areas of the insurable area and providing an insurance decision for the insurable area based on the received set of image items.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In other instances, well-known structures and techniques have not been shown in detail so as not to obscure the disclosure.

Some examples provided herein describe identifying and/or storing user property information. In several examples, identification of such information is performed after the user each user grants explicit permission for such user information to be identified and stored in memory. Each user may be provided notice that such user information will be stored with such explicit consent. The stored user information may be encrypted to protect user security.

The disclosed systems and methods facilitate providing a customer or potential customer of an insurance carrier with an ability to complete an inspection of an insurable area on behalf of the insurance carrier (e.g., for a discounted rate). The term "insurable area," as used herein, may refer to an improvement to real property, including, for example, semi-permanent and permanent structures on real property (e.g. residential or business). The system may be provided in the form of a mobile application running on the customer's mobile device, which may be a smartphone. The inspection completed by the user may provide risk characteristic information to the carrier to be used in rating and underwriting the policy. Accordingly, the disclosed system allows a property inspection to be completed remotely without the cost of the physical presence of an inspector (e.g., being passed on to a consumer), and technology in the disclosed system can save research time on valuing products.

To make decisions regarding the insuring of an insurable area (e.g., a residential dwelling or place of business) a set of information is needed to determine if the insurable area is insurable (e.g., the insurance to value ratio of the insurable area meets a defined threshold such that the risk of insuring the insurable area is justified), and further to determine the correct rate for the insurance (e.g., based on the insurance to value ratio and condition of the insurable area). The insurance to value ratio of an insurable area may be determined based on the replacement cost of the insurable area. Information such as the size and condition of the insurable area may be used for determining the cost of replacement for the insurable area.

The information may be determined based on information provided by or on behalf of the customer ("user provided information") (e.g., from a form filled in for the application, or through other services). The user provided information may include data needed to determine a replacement cost value for the insurable area (e.g., for an insurance to value determination). Typically, an inspection of the insurable area is necessary to verify that the user provided information is accurate (e.g., reflects the real size and condition of the insurable area). This verification is critical as the information is used to make underwriting and rate decisions. The system and method disclosed herein facilitates the collection and verification of information needed for making a decision regarding insuring an insurable area without the need for an inspector.

In relation to a new homeowner's policy, a virtual pre-inspection of an insurable area would result in saved cost and convenience for the insurance carrier and the customer. A mobile application that is geared towards ensuring that requisite required information is gathered and verified by the insurer, without the need for an inspector, facilitates this process.

Figure 1:
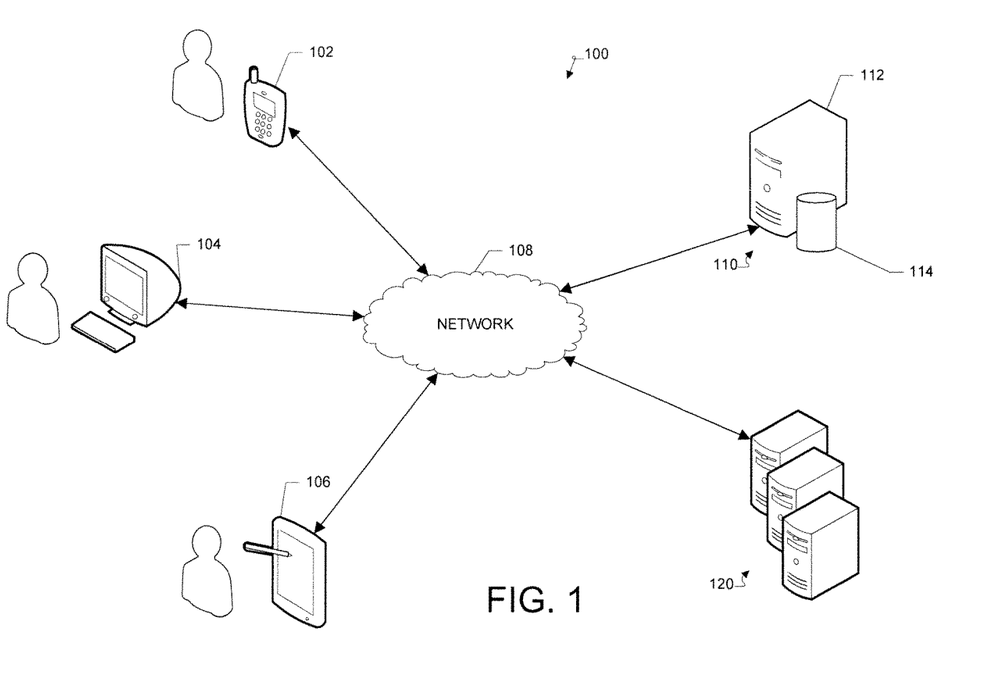
FIG. 1 illustrates an example client-server network environment, which provides for facilitating inspection of an insurable area conducted by a customer or potential customer ("user").

FIG. 1 illustrates an example client-server network environment, which provides for facilitating inspection of an insurable area conducted by a customer or potential customer ("user"). A network environment 100 includes a number of electronic devices 102, 104, 106 communicably connected to a server 110 and one or more remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In certain implementations, electronic devices 102, 104 and/or 106 may be a mobile device. In some examples, electronic devices 102, 104, 106 have an image capturing capability. In the example of FIG. 1, electronic device 102 is depicted as a smartphone, electronic device 104 is depicted as a desktop computer and electronic device 106 is depicted as a Personal Digital Assistant (PDA).

In some implementations, server 110 includes a processing device 112 and a data store 114. Processing device 112 executes computer instructions stored in data store 114, for example, to facilitate collecting information regarding an insurable area through a virtual inspection performed by the user according to various embodiments. Server 110 may further be in communication with remote servers 120 either through the network 108 or through another network or communication means.

Remote servers 120 may be configured to perform various functionalities and/or storage capabilities described herein with regard to the server 110 either alone or in combination with server 110. Server 110 may maintain or be in communication with image recognition services, location services, property valuation services, insurance services and/or other services hosted on one or more remote servers 120.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through various communication protocols. In some aspects, client devices 102, 104, 106, server 110 and/or one or more remote servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

Users may interact with the system hosted by server 110, and/or one or more services hosted by remote servers 120, through a client application installed at the electronic devices 102, 104, 106. Alternatively, the user may interact with the system and the one or more social networking services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

In certain embodiments, a client application (e.g., as a standalone application or accessed through the browser application) hosted by server 110 and running on a mobile device (e.g. client device 102, 104 or 106) is provided to facilitate performing an appraisal to gather necessary information for making underwriting and rate decisions regarding a new policy.

A user (e.g., a customer or prospective customer) may download the application to the user's mobile device. The user may create an account for signing onto the account and/or sign onto the application using an existing account. The user may then select an option to perform a "do-it-yourself" ("DIY") inspection using the mobile application, in response to which instructions are provided detailing how to complete the inspection. The application may provide the user (or other user performing the inspection on behalf of user), with step by step instructions for performing an inspection so that the user can provide image data to extract the needed information to validate and/or supplement existing information needed for underwriting and/or rate decisions. In one example, the information may include user provided information. In another example, information may be gathered from one or more external sources, including, but not limited to public information and records, listings, permits, and other information available regarding the insurable area or portions thereof. In one example, the information includes information regarding the insurable area and/or information regarding owners and/or residents of the insurable area. In one example, the information may include size, condition and other information regarding the insurable area and/or one or more persons or entities associated with the insurable area (e.g., residents, owners, renters, etc.). In one example, the instructions direct the user to capture images (e.g., photos or videos) of specific areas or portions of the insurable area for which information collection or validation is needed. The user may upload the captured images to server 110 hosting the client application.

In one example, the capturing and/or uploading the images may be performed automatically. For example, the user is instructed to provide access to his/her image capture device to the client application. The client application is then able to perform the image capture and/or upload. The inspection may be a combination of image capture, panoramic image capture, or video capture, and the captured images may include images and/or video captured during the inspection.

The uploaded captured images are used to validate existing user provided information and/or to gather additional information needed to complete the decision process for insuring the insurable area. In some examples, the decisions may be made in real time (e.g., where the information requiring validation or missing are extracted from the captured images in real time).

Figure 2:
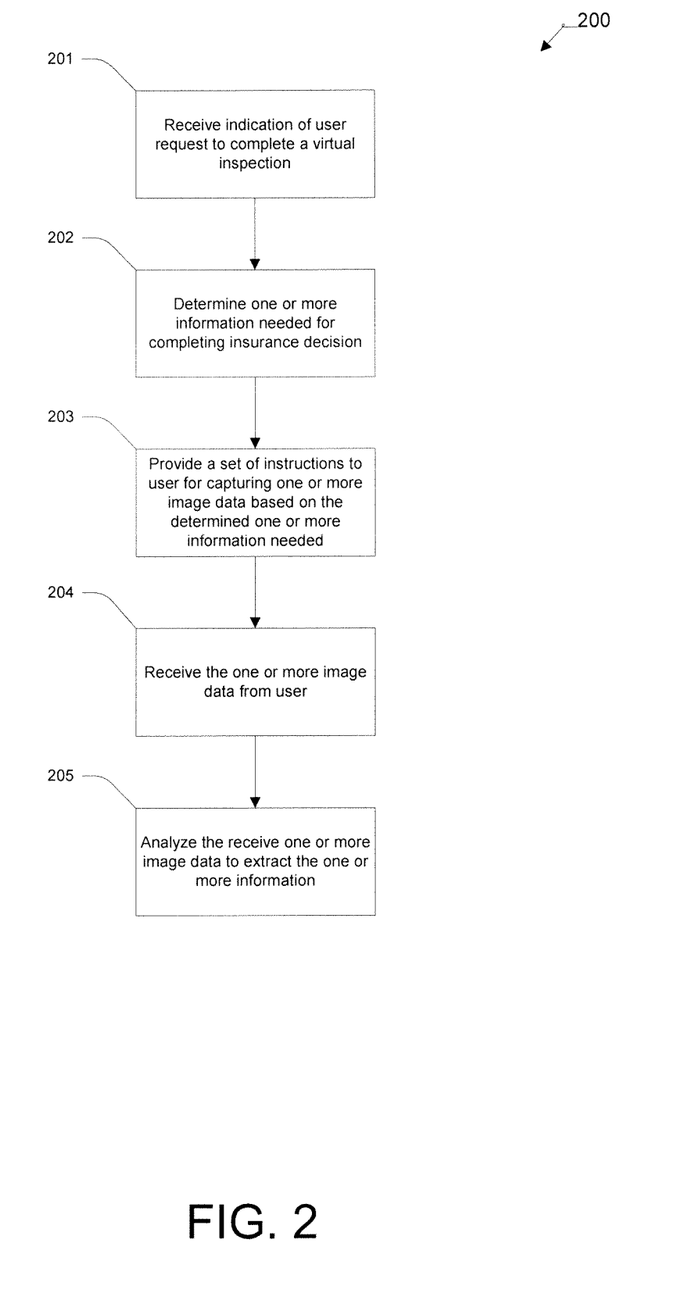
FIG. 2 illustrates an example process for facilitating a virtual inspection of an insurable area.

FIG. 2 illustrates an example process 200 for facilitating a virtual inspection of an insurable area. In step 201 an indication of a user requesting to complete a virtual inspection is received. In one example, the user may access a client application at the user mobile device and may request to perform a virtual inspection. In one example, the client application may require that the user sign into the application using a user account (e.g. using a user name and/or password). The user account may be associated with the insurable area (e.g. using an address or identifier). In one example, during authentication, a location of the mobile device may be determined and compared to the location associated with the insurable area to confirm that the inspection is occurring at the intended insurable area. Upon accessing the application and/or signing in, the user may be provided with an option to begin an inspection.

In step 202, one or more information needed for completing an insurance decision for the insurable area are determined. In one example, the information may include information needed to verify and/or supplement existing information provided with regard to the insurable area (e.g. through an application, by a user and/or from one or more other sources). The existing information may be analyzed to determine specific information needed to complete the process. The information may for example include size and condition information.

In step 203, based on the information needed, as determined in step 202, and/or existing information regarding the insurable area and/or persons associated with the insurable area, a set of instructions for capturing one or more image data is provided to the user. In one example, the set of image data are images needed to obtain the information determined in step 202. In one example, the instructions may be delivered to the user via a live agent and/or may be provided as a list of images needed to complete the inspection process. In some examples, the user may be instructed to provide control of the mobile device to the system and the system may perform the image capture process to obtain the one or more image data.

In step 204, the one or more image data are received from the user. For example, the user may capture each image per the provided instructions and may upload the captured images (e.g. to the server hosting the application). In another example, the capture and/or upload of the image data may be performed automatically.

In step 205, the received one or more image data is analyzed to extract the one or more information needed. In some examples, some or all of the one or more information may be obtained by analyzing the image data and extracting information from the captured images. In one example, the analyzing and extraction of information may be performed by an agent, and/or automatically. The information may be used to validate existing information (e.g. information regarding size or condition of the insurable area), or to obtain additional information (e.g. information regarding condition, size, etc.). Condition information may, for example, include, conditions that increases likelihood of damage, such as lack of upkeep and maintenance, hazardous conditions (e.g. lack of fence around the pool or trampoline, missing shingles, missing siding, broken windows). Size information may include the size of the property, such as square footage information of the entire insurable area, land size, dwelling or structure sizes, size of specific portions of the insurable area (e.g., rooms) and/or other size information. Other information may include the number of structures, and/or the floor plan and details of each structure, including for example number of rooms, bathrooms and other parts of the structures and/or insurable area generally.

In one example, in addition to information regarding the insurable area, the information may further include information regarding items within the insurable area. For example, images captured within the dwelling may include images of personal property or belongings (e.g. contents such as furniture, electronics, home appliances, vehicles, bikes, bicycles, equipment, clothing, etc.) within the insurable area (e.g., home or place of business). In some examples, one or more images (e.g., images or video) of user belongings are captured and processed to index objects (or "items") in the images. The information regarding the personal property and belongings may include condition and price information for the recognized objects. The information may be used in supplementing or verifying information regarding the insurable area to make an insurance decision (e.g., value or condition decisions).

In one example, each captured image may be associated with location information. For example, each image may include a geotag that indicates a location where the image was captured. In another example, a location of the mobile device may be determined and associated with the image. The location of each image item may be compared to a location (e.g. address) associated with the insurable area to validate that the captured images correspond to the insurable area. The extracted information may then be used to make a decision regarding insuring the insurable area. In some examples, the decision may include determining that the application is in good order, and a rate and/or other details of the insurance policy may be determined and/or provided to the user. In another example, the decision may include determining that further information is needed. For example, a representative may, after reviewing compiled information (e.g. the captured images and/or existing information), contact the user if any additional information is needed. In some examples, the decision may include determining that the insurable area cannot be insured based on the information. Similar virtual inspections may also be performed during the lifetime of the insurance, for example, at time of renewal, or adjustment to the policy.

Figure 3A:
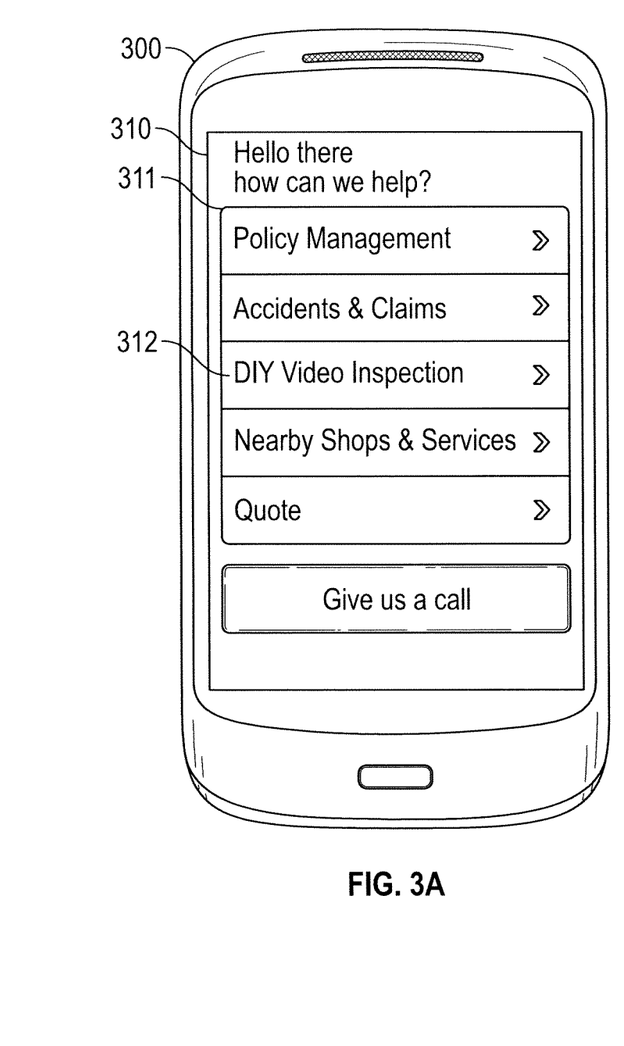
FIGS. 3A-3D and 4A-4D illustrate example graphical user interfaces ("UI") provided to a user to facilitate a virtual inspection using a mobile device.
Figure 3B:
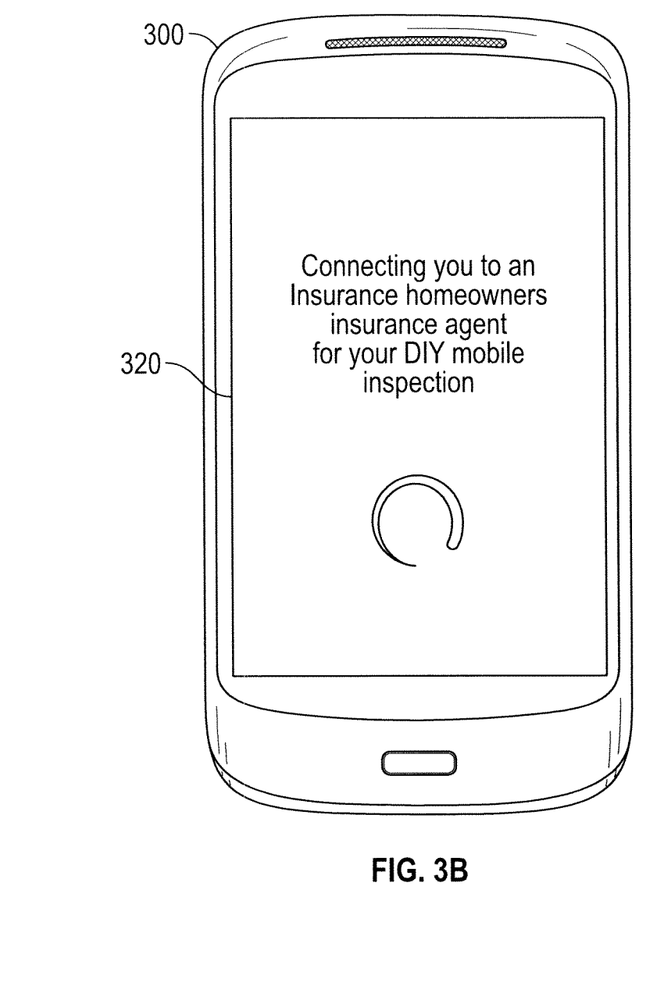
Figures 3C, 3D:
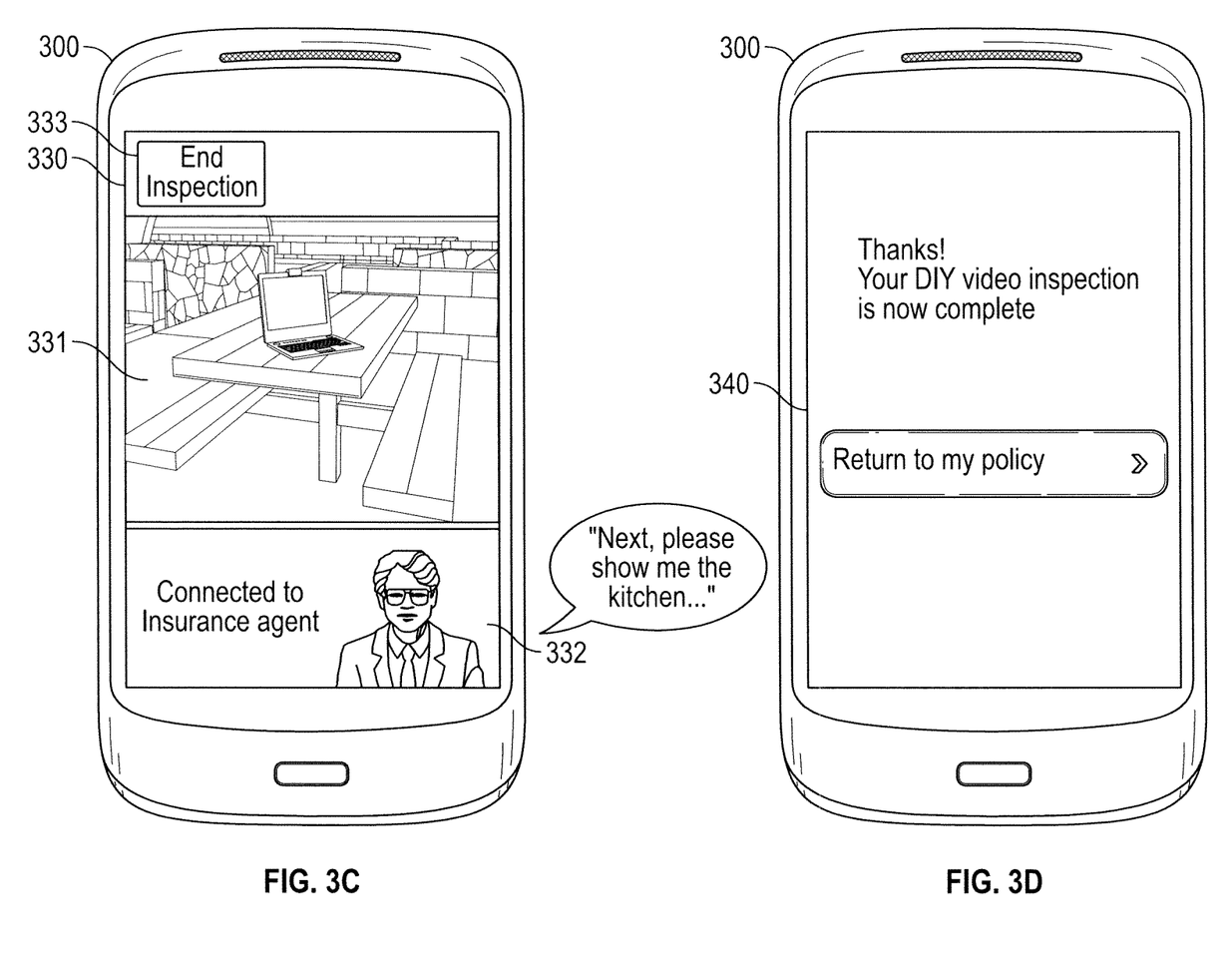

FIGS. 3A-3D illustrate example graphical user interfaces provided to a user to facilitate a virtual inspection using a mobile device 300. The UIs illustrated in FIGS. 3A-3D may for example be displayed where instructions are provided to the user through a live agent (e.g. a human or computer simulated agent). FIG. 3A illustrates a first UI 310 displayed to a user, when the user first accesses and/or signs on to the application (e.g., the virtual inspection application installed on or accessible through mobile device 300). A menu 311 may be provided for display within UI 310, displaying various services and/or functions facilitated by the application. The user may, upon viewing the menu 311, select menu option 312 to perform a "DIY Video Inspection." Upon receiving the selection, a second UI 320 may be displayed to the user as shown in FIG. 3B. UI 320 may display a message indicating that the user is being connected to an insurance agent to perform a DIY inspection. Once the connection is established, a UI 330 may be displayed to the user, as shown in FIG. 3C. The UI 330 includes a window 331 displaying what is being captured, an agent window 332 displaying text or image data regarding the live agent, and a button 333 for ending and/or completing the inspection. The agent may provide step by step instructions for the user to capture images from one or more areas within the insurable area. In one example, the agent or user may control the image capturing process, and may capture the necessary images (e.g. video).

In one example, the mobile device 300 may be configured to enable remote control of certain functions of the mobile device 300 by a live agent. For example, the application on the mobile device 300 may be configured to access various capabilities of the mobile device 300 or capabilities of devices in communication with the mobile device 300. For example, the application may have access to one or more cameras on the mobile device (e.g., a front-facing camera and/or a rear-facing camera), microphones on the mobile device, or other sensors or components on the device (e.g., an accelerometer, infrared sensors, a global positioning system, a light, etc.). The application on the mobile device 300 may also provide a way for the live agent to access and control the various functions or capabilities through the mobile device 300 and/or a system (e.g., operating system, or other application system) or processor at the mobile device 300.

In some examples, the mobile device may provide an interface and/or capability for the live agent to control certain capabilities of the mobile device 300 (e.g., remote control). The live agent, for example, may request that the mobile device 300 capture an image, activate a flash when capturing an image, turn on a light on the mobile device, zoom in the camera, focus the camera, adjust an exposure setting on the camera, or switch a view on a display on the mobile device.

The switching of the view on the display of the mobile device 300 may include switching the view to at least one of a view of what a front-facing camera is detecting, a view of what a rear-facing camera is detecting, or a video conferencing view of a remote camera (e.g., a view of a camera at and/or in communication with the mobile device 300 or a view of the live agent). In additional aspects, switching a view may include changing the display on the mobile device 300 to a portrait view, a landscape view, or a picture-in-picture view of multiple views.

Upon completion of the inspection (e.g., when all needed images have been captured), the user may select the "End Inspection" button 333. The selection may, in some examples, upload all captured images (e.g. video). In another example, the captured images may be uploaded as they are captured. As shown in FIG. 3D, in response to the user selecting the button 333, a UI 340 may be displayed to the user once the inspection has been completed.

Figure 4A:
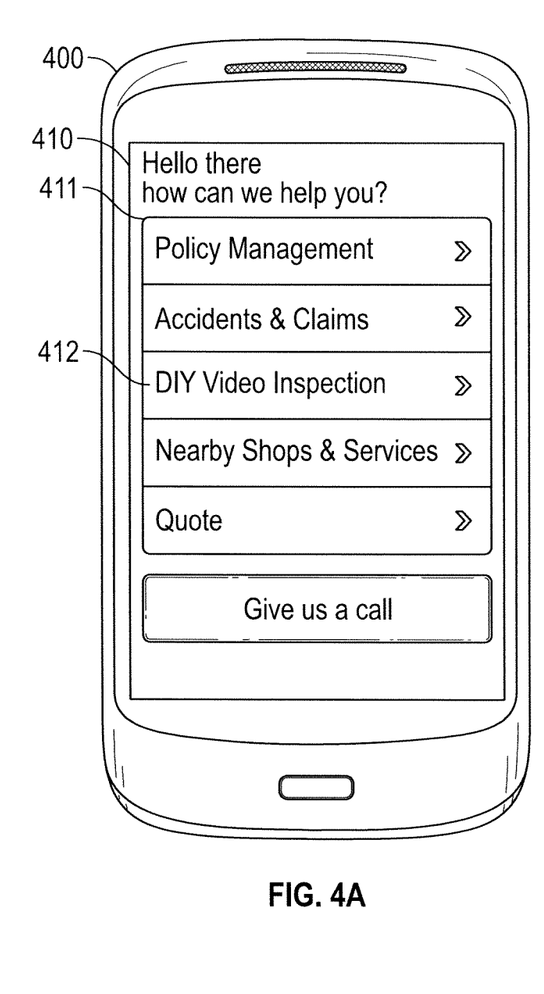
Figure 4B:
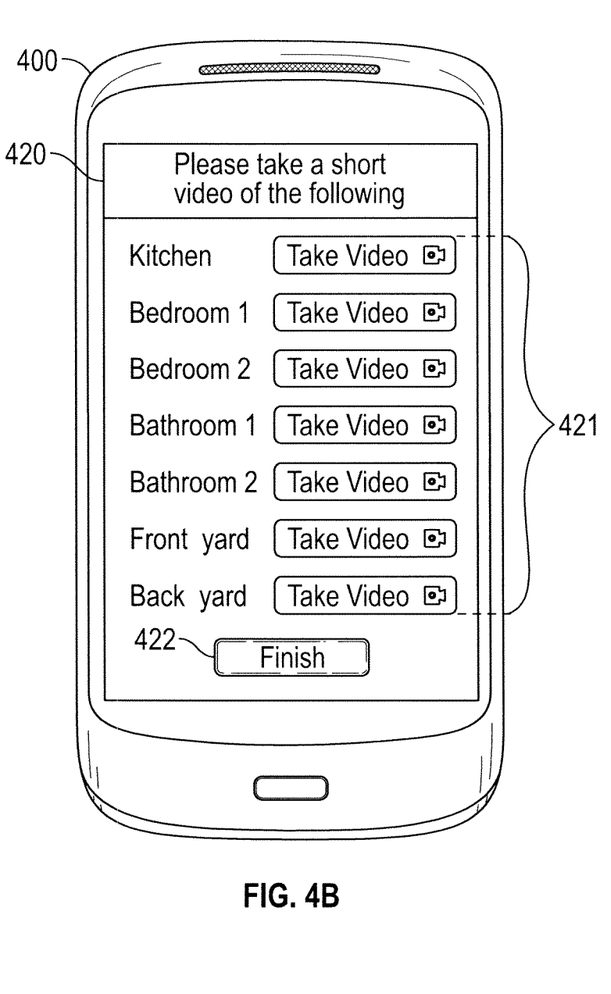
Figure 4C:
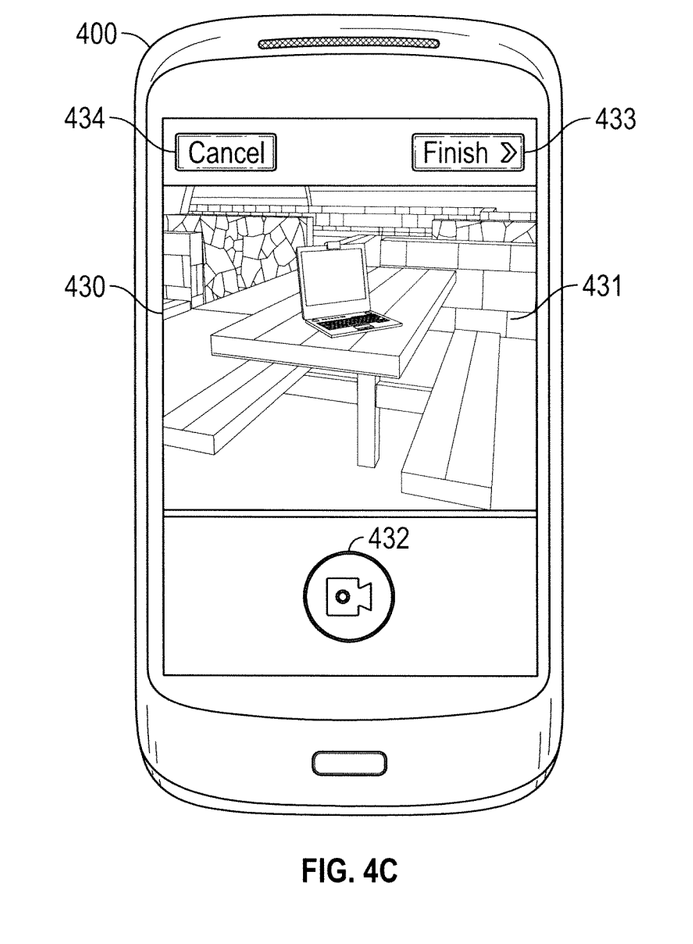
Figure 4D:
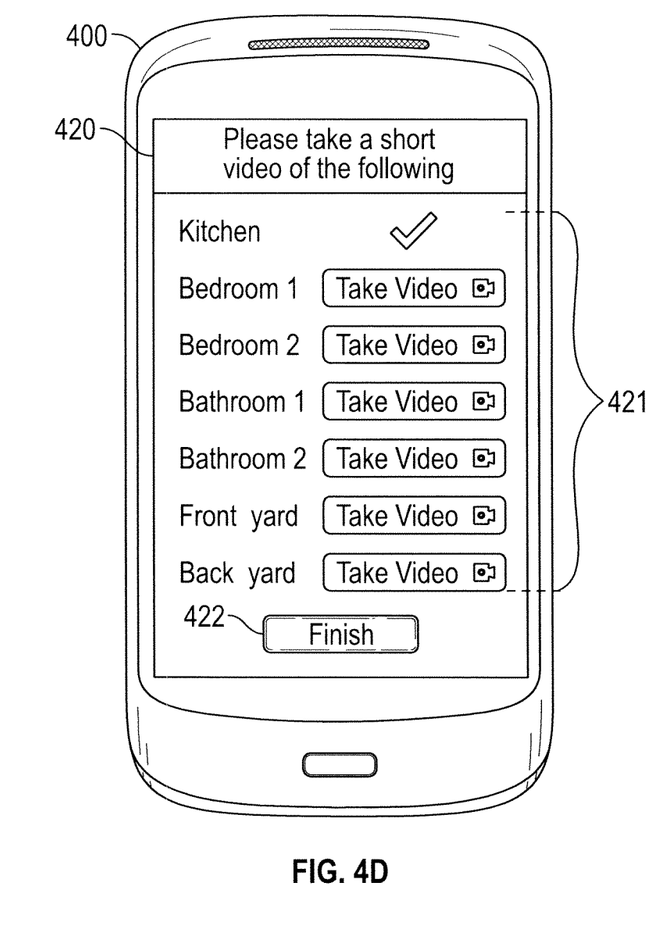

FIGS. 4A-4D illustrate example graphical user interfaces provided to a user to facilitate a virtual inspection using a mobile device 400. FIG. 4A illustrates a first UI 410 displayed to a user, when the user first accesses and/or signs on to the application. A menu 411 may be provided for display within UI 410, displaying various services and/or functions facilitated by the application. The user may, upon viewing the menu 411, select menu option 412 to perform a "DIY Video Inspection." Upon receiving the selection, a second UI 420 may be displayed to the user as shown in FIG. 4B. UI 420 may display a list 421 of areas where the user needs to capture images (e.g. video). A "Finish" button 422 is provided, to allow the user to end and/or complete the inspection. The user may begin the inspection by selecting an option from the list 421 using the "take video" button, next to the specific area where the user wishes to capture the image (e.g. video). In some examples, the user is not required to proceed in the order the areas are listed and may select any of the areas to begin the inspection process. Upon selection of an area from the list 421, UI 430 is provided for display to the user, as shown in FIG. 4C. UI 430 may include a window 431 displaying what is being captured, a capture button 432 for beginning to capture the image, a button 433 for ending and/or completing the capture process and a button 434 for canceling the capture process. In one example, the user may control the image capturing process, and may capture the necessary images (e.g. video). In another example, the user may give control of the device 400 to the system and the system may perform the inspection. Upon selecting the finish button 433, the user is directed back to the UI 420, as shown in FIG. 4D. A checkmark next to the "kitchen" on list 421 indicates that image data for the kitchen has been received. The image may be locally stored for later update (e.g. upon selection of the button 422) or may be uploaded once the user has captured the image. The user may select another item of the list 421, until all needed image data has been captured and/or uploaded. Upon completion of the inspection (e.g., when all needed images have been captured), the user may select the "Finish" button 422. The selection may, in some examples, upload all captured images.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
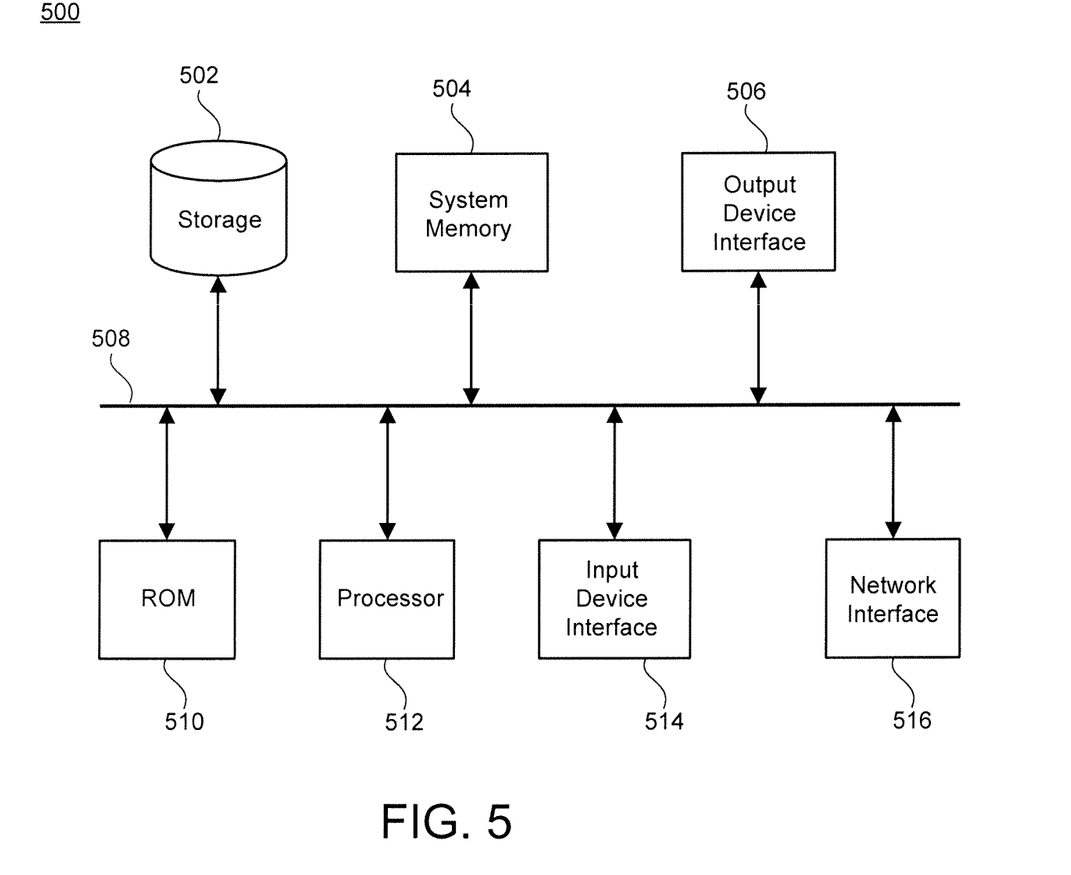
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for facilitating a virtual inspection using a mobile device according to various embodiments. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be used together. Features under one heading may be combined with features under one or more other heading and all features under one heading need not be used together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for a virtual inspection, comprising:
   determining, by a computer server, information to be used for performing an inspection of an insurable area of property;
   providing, at the computer server and via a communication network, instructions to a mobile device to capture one or more images based on the determined information;
   receiving, via the communication network, the one or more images from the mobile device in response to the instructions;
   analyzing, by the computer server, the one or more images to determine a location of the mobile device when the one or more images were captured based on geotag information associated with the one or more images;
   validating, by the computer server, the one or more images by comparing the location of the mobile device to a location of the insurable area of property;
   identifying of the information to be used for performing the inspection based on the validated one or more images; and
   providing an insurance rate based on the identified information.

2. The method of claim 1, wherein determining the information comprises:
   accessing a set of existing information provided regarding the insurable area of property; and
   identifying the information needed to verify or complete the existing information.

3. The method of claim 1, wherein identifying the information includes:
   analyzing the one or more images; and
   extracting the information from the one or more images.

4. The method of claim 1, wherein the information includes one or more of a size or a condition regarding the insurable area of property.

5. The method of claim 1, wherein the information includes information regarding an index of one or more belongings or personal property in the insurable area of property.

6. The method of claim 1, wherein identifying the information includes determining that the information supplements or verifies existing information.

7. The method of claim 1, further comprising providing the instructions to the mobile device using a live agent simulated by a computer.

8. The method of claim 7, further comprising:
   receiving a request to perform the inspection; and
   establishing a connection to the live agent in response to receiving the request.

9. The method of claim 1, wherein the instructions comprise a list of one or more portions of the insurable area of property for capturing the one or more images.

10. The method of claim 9, further comprising determining the instructions by identifying the one or more portions of the insurable area of property from which image data is needed.

11. The method of claim 1, wherein the one or more images include one or more of videos or still images.

12. The method of claim 1, further comprising detecting that the a user has accessed an application at the mobile device, wherein the information is determined in response to the detection.

13. A non-transitory computer-readable medium having computer-executable instructions stored thereon for execution by a processor to perform a method for virtual inspection, the method including:
   determining, by a computer server, information to be used for performing an inspection of an insurable area of property;
   providing, via a communication network, instructions to a mobile device to capture one or more images based on the determined information;
   receiving, via the communication network, the one or more images from the mobile device in response to the instructions;
   analyzing, by the computer server, the one or more images to determine a location of the mobile device when the one or more images were captured based on geotag information associated with the one or more images;
   validating, by the computer server, the one or more images by comparing the location of the mobile device to a location of the insurable area of property;
   identifying of the information to be used for performing the inspection based on the validated one or more images; and
   providing an insurance rate based on the identified information.

14. A system, comprising:
   at least one data processor; and
   at least one memory storing instructions, which when executed by the at least one data processor, result in operations comprising:
      determining, by a computer server, information to be used for performing an inspection of an insurable area of property;
      providing, via a communication network, instructions to a mobile device to capture one or more image based on the determined information;

receiving, via the communication network, the one or more images from the mobile device in response to the instructions;

analyzing, by the computer server, the one or more images to determine a location of the mobile device when the one or more images were captured based on geotag information associated with the one or more images;

validating, by the computer server, the one or more images by comparing the location of the mobile device to a location of the insurable area of property;

identifying the information to be used for performing the inspection based on the validated one or more images; and providing an insurance rate based on the identified information.

15. The system of claim 14, wherein the one or more images include one or more of videos or still images.

\* \* \* \* \*